(12) United States Patent
Miglioranza

(10) Patent No.: US 12,459,028 B2
(45) Date of Patent: Nov. 4, 2025

(54) METHOD FOR OPTIMISING THE CUTTING AND HANDLING UNIT FOR ELONGATED PRODUCTS

(71) Applicant: SCHNELL S.P.A., Colli al Metauro (IT)

(72) Inventor: Aronne Miglioranza, Colli al Metauro (IT)

(73) Assignee: SCHNELL S.P.A., Colli al Metauro (IT)

( * ) Notice: Subject to any disclaimer, the term of this patent is extended or adjusted under 35 U.S.C. 154(b) by 265 days.

(21) Appl. No.: 17/793,693

(22) PCT Filed: Feb. 8, 2021

(86) PCT No.: PCT/IT2021/050028
§ 371 (c)(1),
(2) Date: Jul. 19, 2022

(87) PCT Pub. No.: WO2021/156899
PCT Pub. Date: Aug. 12, 2021

(65) Prior Publication Data
US 2023/0065499 A1 Mar. 2, 2023

(30) Foreign Application Priority Data
Feb. 6, 2020 (IT) .......................... 102020000002365

(51) Int. Cl.
*B21D 43/00* (2006.01)
*B21D 43/28* (2006.01)
(Continued)

(52) U.S. Cl.
CPC ......... *B21D 43/006* (2013.01); *B21D 43/285* (2013.01); *B65G 1/0464* (2013.01);
(Continued)

(58) Field of Classification Search
CPC .................... B65G 1/0464; B65G 1/16; B65G 2201/0217; B23D 33/006; E04C 5/02; B21D 43/006; B21D 43/285
(Continued)

(56) References Cited

U.S. PATENT DOCUMENTS 3,871,288 A * 3/1975 White ..................... B65B 27/10
414/745.7
4,732,066 A * 3/1988 Del Fabro ............. B21F 23/005
198/456
(Continued)

FOREIGN PATENT DOCUMENTS

DE 2704230 A1 8/1977
EP 0188850 A2 7/1986
(Continued)

*Primary Examiner* — Glenn F Myers
(74) *Attorney, Agent, or Firm* — McGlew and Tuttle, P.C.

(57) ABSTRACT

The method for optimising the cutting of elongated products, in particular bars or profiles for reinforced concrete, comprises the steps of arranging in succession along a longitudinal feed direction (Y) a feeding area (5), a cutting assembly (3) and a measuring path (4) for the products (2), the measuring path (4) being configured to receive on a respective receiving plane (4a) the products (2a) cut by the cutting assembly (3). The method also provides for arranging a storage (6) divided into a plurality of compartments (7) downstream of the measuring path (4), for receiving the cut products (2a).

32 Claims, 13 Drawing Sheets

(51) Int. Cl.
*B65G 1/04* (2006.01)
*B65G 1/16* (2006.01)
*E04C 5/02* (2006.01)

(52) U.S. Cl.
CPC ................ *B65G 1/16* (2013.01); *E04C 5/02* (2013.01); *B65G 2201/0217* (2013.01)

(58) Field of Classification Search
USPC ...................................................... 414/745.7
See application file for complete search history.

(56) References Cited

U.S. PATENT DOCUMENTS

| | | | | |
|---|---|---|---|---|
| 5,427,490 | A * | 6/1995 | Tokiwa ................ | B65G 1/0442 414/280 |
| 8,136,653 | B2 * | 3/2012 | Okimoto ................ | B23D 33/02 414/20 |
| 2004/0261485 | A1 | 12/2004 | Peruzzo et al. | |
| 2008/0131256 | A1 * | 6/2008 | Veit ...................... | B65G 47/907 414/730 |

FOREIGN PATENT DOCUMENTS

| | | |
|---|---|---|
| EP | 3351316 A1 | 7/2018 |
| IT | BO94A000108 A1 | 9/1995 |

\* cited by examiner

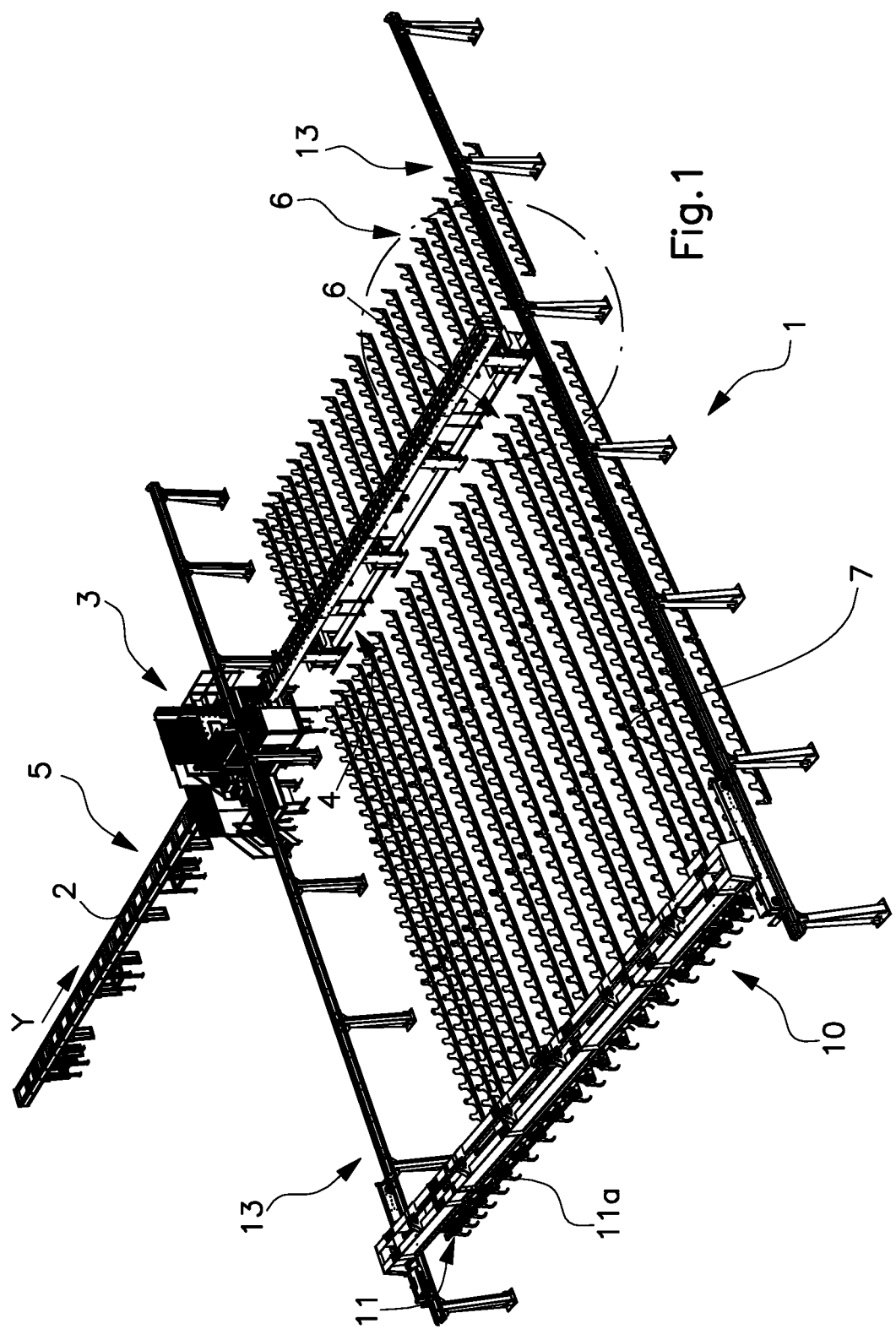

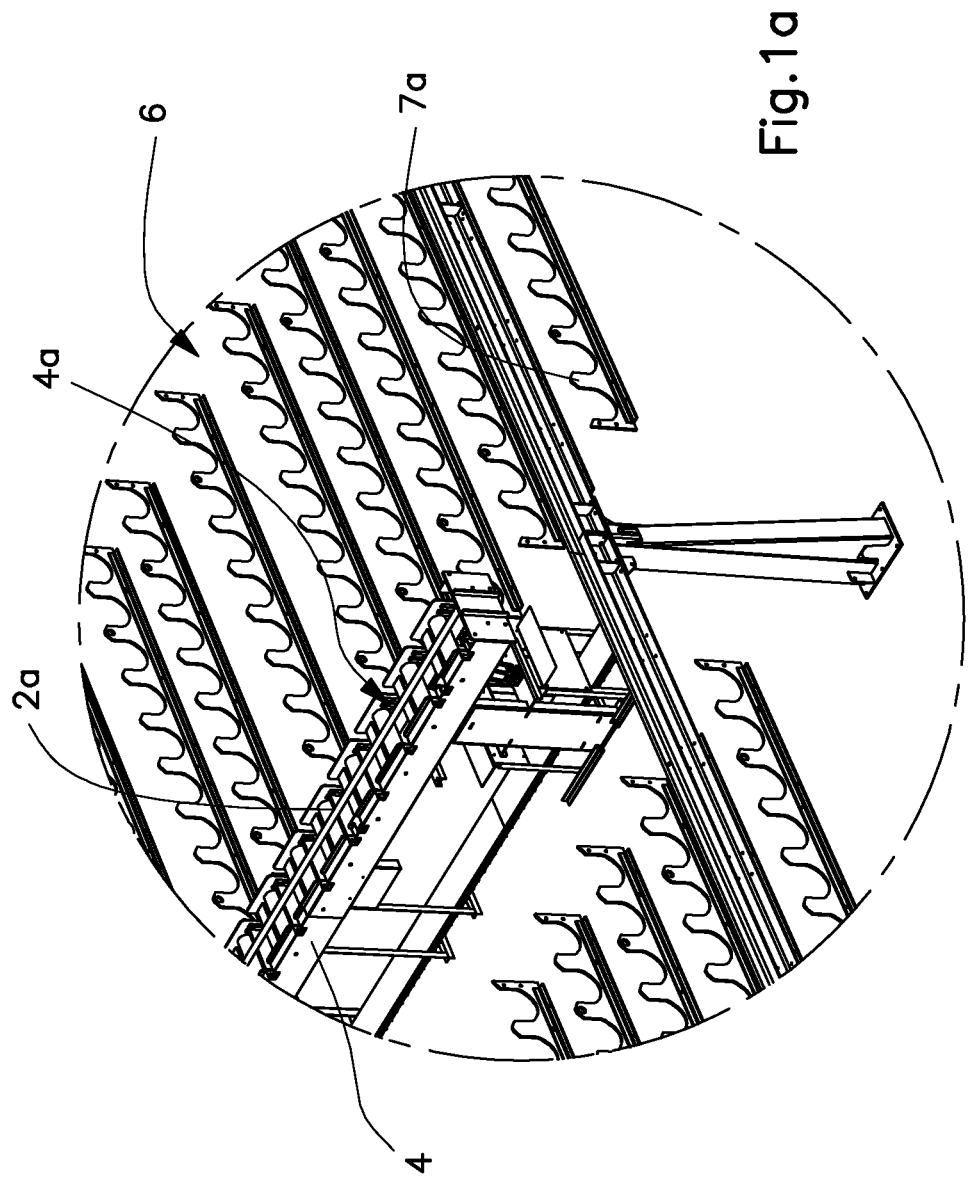

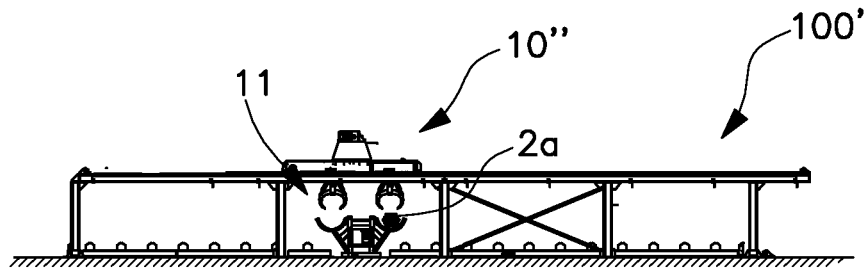
Fig.17
Fig.18
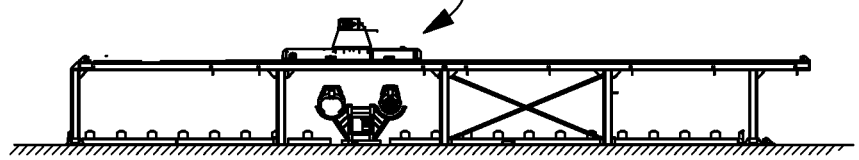
Fig.19
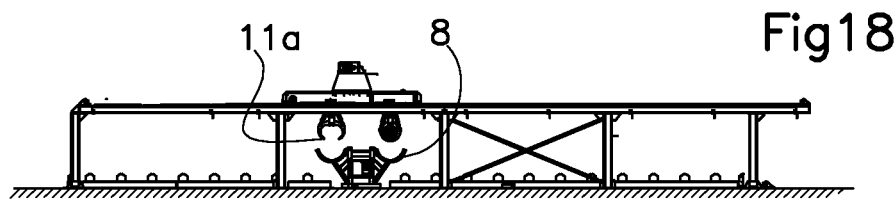
Fig.20
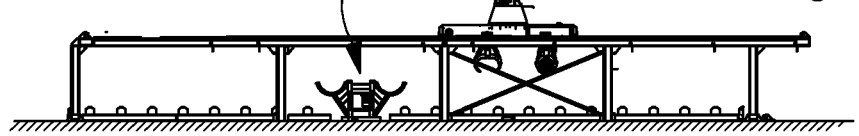
Fig.21
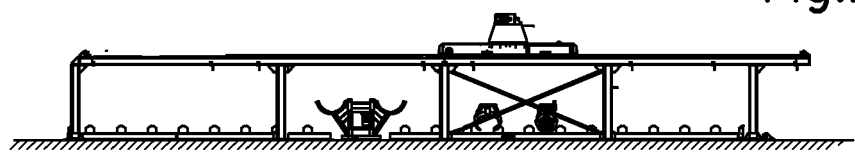
Fig.22
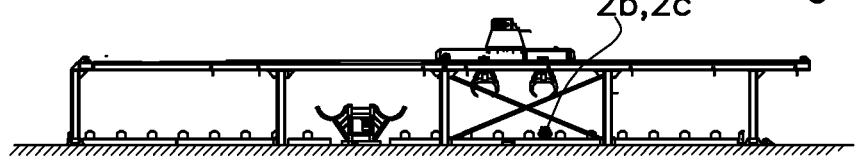

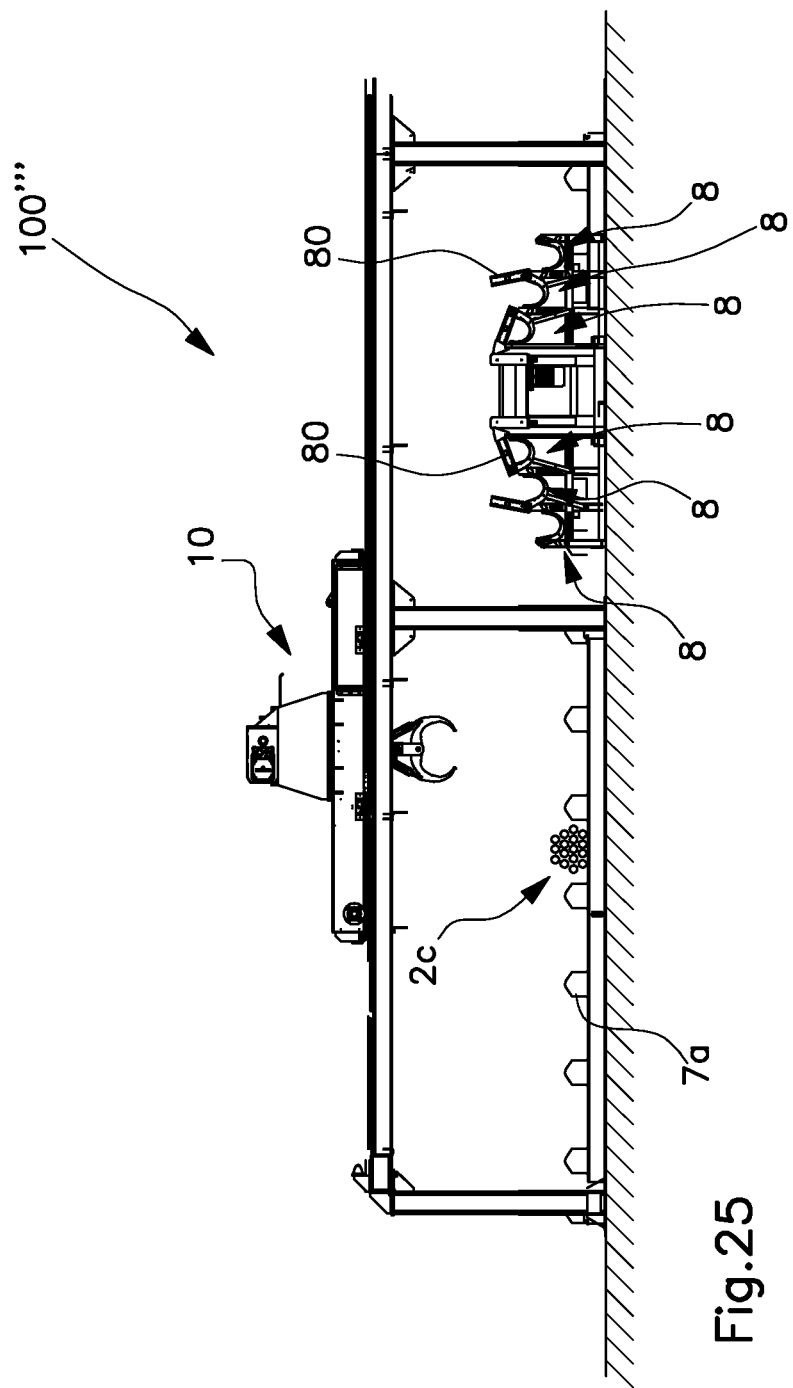

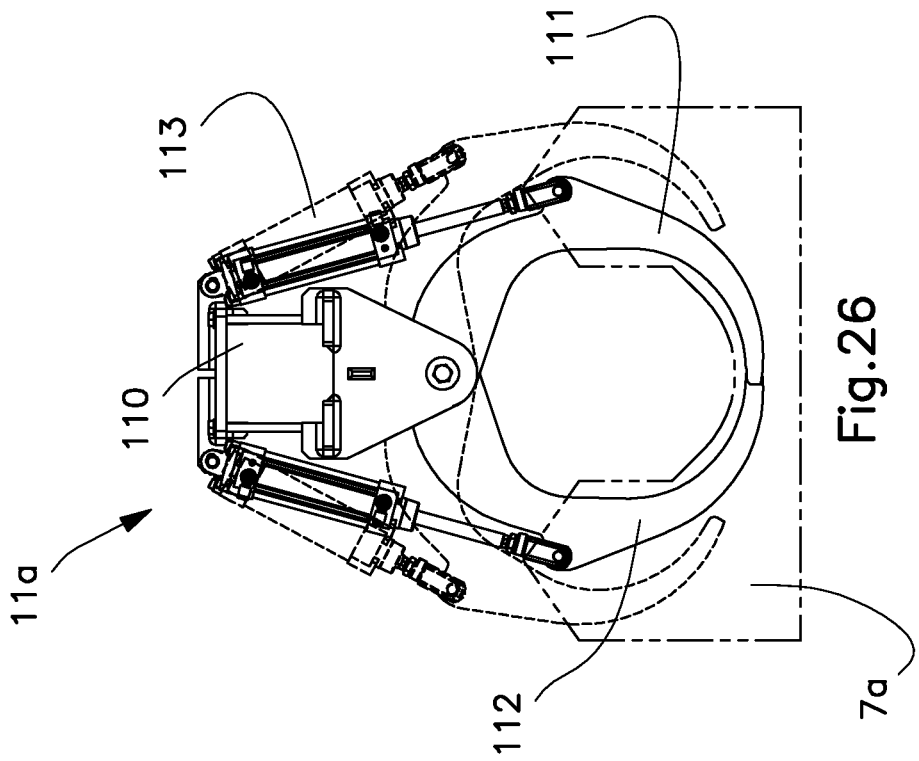
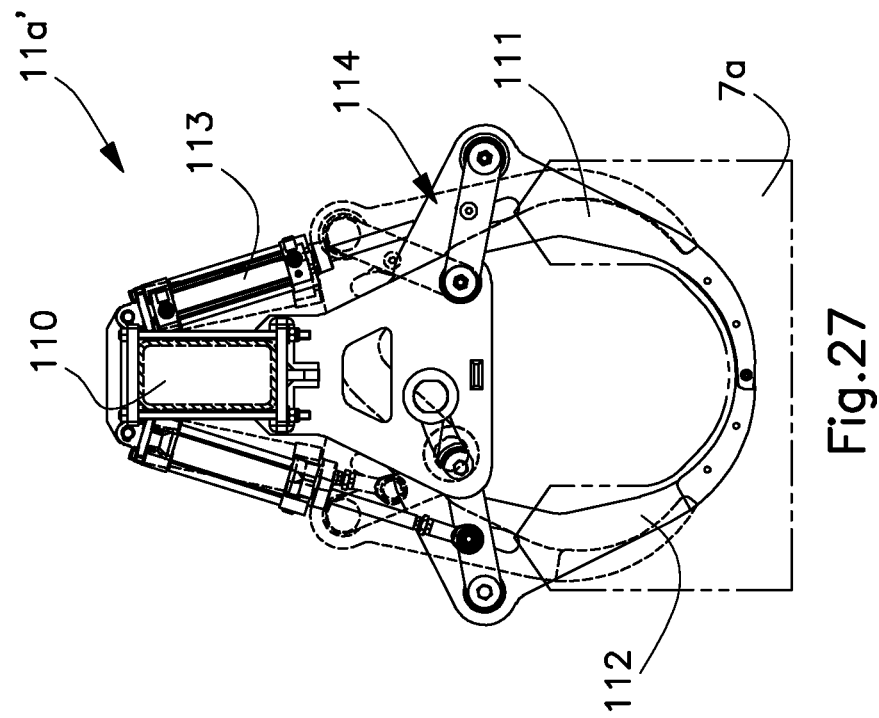

METHOD FOR OPTIMISING THE CUTTING AND HANDLING UNIT FOR ELONGATED PRODUCTS

TECHNICAL FIELD

The present invention relates to a method for optimising the cutting and a manipulator assembly for elongated products, in particular metal profiles or rods in bars for reinforced concrete.

BACKGROUND OF THE INVENTION

Apparatuses for producing bars cut to size are known, usually comprising in succession: a feed line for raw material, a cutting assembly, generally of the shear type, and a measuring line, at which the raw material is positioned to size starting from a respective separation section for cutting at the desired longitudinal distance. Subsequently the raw material is possibly moved longitudinally and unloaded to form the same bunch or different bunches of bars cut to size.

For example, the patent EP 0188850 A2 illustrates a feeding device for bars, positioned upstream of a cutting machine.

More precisely, such apparatuses are capable of cutting to size, for example, one or more bars that make up the reinforcement of buildings with a reinforced concrete structure.

Therefore, there is a need both to cut the bars to the desired size and to group them in an orderly manner in bunches, for performing any subsequent processing steps and for the delivery.

For this reason, the aforementioned measuring line is generally equipped, in particular put side by side, by containment means that form compartments, selectively accessible by simple fall, in which the aforementioned bundles of bars can be composed, even in subsequent cutting cycles.

These compartments may have different conformations, for example pockets, roller ways, "bins", or "racks". In any case, these compartments essentially perform the function of accumulating the cut bars, to be grouped into respective bunches, waiting for these bunches to be completed. Therefore, the aforesaid compartments perform the important function of optimisation of the cutting and composition operations of the bunches of bars cut to size.

In fact, the cutting of the bars has the problem of optimisation, that is the need to combine cutting operations of different sizes, performing the so-called "nesting", in order to minimise the waste or scrap of the raw material. Indeed, it is a complicated operation, once carried out by an operator who, although experienced, could nevertheless mentally manage a limited number of combinations, trying to combine different cutting lengths in order to minimise waste.

Currently, thanks to the advent of special computer or software programs and the computing power of modern computers, the high number of combinations no longer represents a limit to optimisation, while the real limit of the system is represented by the limited number of optimisation compartments that may be arranged downstream of the measurement lines.

In fact, the known type of optimisation compartments are currently significantly lower in number than the number of bunches, and therefore of "lots", which a computerised cutting system can manage.

As an example, it is observed that if a cutting cycle involves the combination of different lengths, for example three, four and five meters, starting from a raw material with a length of twelve meters, and if this combination is repeated several times, at least three optimisation compartments are needed to be accessible at each cutting cycle to deposit the different types of product separately, if required, until the respective bunches are completed. Any solutions with "sequence" type storage would not meet the aforementioned need for optimisation since it would not be possible, in the cutting cycles following the first one, to access the storage already used to complete the still open bunches.

The optimisation compartments of known type are equipped with appropriate devices that enable gravity access in each of them to the cut bars. The formed bunches may then be unloaded from the individual storage compartments.

To enable access to the bars, the known compartments work according to the "loss of height" principle: the cut bars are released by gravity into the individual optimisation compartments arranged, at a lower level, laterally to the measuring path.

In this regard, patent application BO94A000108 by the same Applicant illustrates for example a storage device, used downstream of cutting lines.

The traditional optimisation compartments located next to the measuring path and accessible by gravity are therefore in limited number, due to the limited "loss of height" available, and are also quite expensive due to the aforementioned devices that are used to selectively access the compartment to be used.

The specific sector therefore complains of a limited level of optimisation. In order to allow the limited number of optimisation compartments, the entire cutting system must therefore be raised to have a greater leap in height between that of the measuring path and that of the operating machines that are downstream, to complete the work. However, the raising of the cutting plant involves, in addition to an increase in costs, also a worsening of the accessibility of maintenance machinery and, consequently, greater risks for employees.

In addition, current chutes generate considerable noise in the working environment. This circumstance outlines a serious problem for all the operators of the plant, who are thus exposed to a high level of acoustic pressure. The high noise level is a problem intrinsically related to the fall of the bars on top of each other, due to the use of gravity as a means of driving the bars from the measuring path, in practice for the use of the "loss of height".

As soon as the bunches are completed, therefore "closed", the optimisation compartments may be emptied and thus available to receive the cut bars in subsequent cutting cycles.

In addition to the problem of optimising the cutting cycles, there is a further problem in conventional cutting systems. In fact, the limited number of optimisation compartments also has an impact on the sequence of processes downstream of the cutting line, for example on bending processes. Given that the optimisation compartments must be emptied as soon as possible, in order not to stop the cutting line, this forces the downstream apparatuses to work in the order imposed by the cutting line and, in particular, by the "closing" of the bunches of cut bars, thus following only a limited logic dictated by the requirements of production. Alternatively, to better follow the production logic, the "closed" bunches may be moved and handled towards parking areas, with additional costs in terms of space, time, risks and energy spent in handling.

As a further alternative, the "closed" packs are transported, overturned and deposited in a parking warehouse preferably on the ground, the so-called "ground buffer", from which, when needed, they are picked up to be transported to further processing. In said warehouse, the "closed" bunches are deposited in individual parking spaces or cradles.

The parking storage has the function of freeing the cycles of the cutting machine from those of the machine for further processing. However, this solution is expensive in terms of overall dimensions, since usually the parking storage comprises a large number of cradles arranged in a longitudinally subsequent position downstream of the cutting system, equipped with expensive equipment, for handling the "closed" bunches to and from the storage.

In conclusion, the known solutions do not allow the optimisation of the production cycles at the level currently allowed, in theory, by the means of information technology.

Disclosure

The object of the present invention is to solve the aforementioned problems, devising a method for optimising the cut and a manipulator assembly for elongated product that optimises space and production efficiency.

A further object of the present invention is to provide a manipulator assembly for elongated products, having simple construction and functional conception, equipped with safe and reliable use, as well as relatively not expensive.

The aforementioned objects are achieved, according to the present invention, by the method for optimising the cutting according to claim 1, as well as by the manipulator assembly for elongated products which implements this method, according to claim 12 and by the apparatus according to claim 22.

The method according to the invention, for optimising the cutting of elongated products, in particular bars for reinforced concrete, provides for arranging a feeding area, a cutting assembly and a feed path for products, in succession along a longitudinal feeding direction, said measurement path being configured for receiving the products cut by the cutting assembly on a respective receiving plane.

The method also provides for preparing at the side of the measuring path a storage divided into a plurality of compartments to house the cut products.

Preferably the compartments are arranged parallel to the longitudinal development of the measuring path.

In particular, each compartment of the storage is suitable for receiving the cut products grouped in bunches formed also following subsequent cutting cycles. The aforementioned bunches are defined as "closed" when they include a required quantity of cut products and "open", in formation, until the required quantity of cut products is reached. Each bunch generally comprises cut products of the same required size, the storage being able to receive in different compartments or in succession along the same compartment, which differ in quantity and/or in measure of the grouped cut products.

The method further provides for arranging a manipulator assembly comprising at least one gripping device configured to grip the aforementioned cut products and operating at least at the side of the measuring path. The gripping device is movable in a collecting motion according to a collecting direction and in a discharge motion according to a discharge direction, as well as in a transfer motion relative to the measuring path.

The method also provides for the step of feeding the products along the measuring path and in a suitable phase relation to operate the cutting group, in a cutting cycle, in order to operate one or more consecutive cuts on the fed products and obtain along the receiving plane one or more series of products cut in succession, of the same size or of different sizes in the same cutting cycle.

Products fed in a cutting cycle means any number of products, one or more.

Cutting cycle means one or more actuations of a cutting member of the cutting assembly, in particular lowering and lifting of a shear, on the fed products, to obtain more segments, i.e. products cut into groups of the same length or of different length depending on the distance between one actuation of the cutting member and the next.

The method further provides for operating the gripping device in the aforementioned collecting motion according to the aforementioned collecting direction, in order to collect and at least partially hold the collected cut products.

The method then provides for operating the manipulator assembly in the aforementioned transfer motion, for transferring the held products to at least one selected compartment within the storage. Preferably, the manipulator assembly may perform successive transfer cycles, for dividing the products collected in different compartments or along the compartments of the storage.

The method then provides for positioning the gripping device at the selected compartment.

The gripping device is then operated according to the unloading motion in the aforesaid unloading direction, so as to release, preferably by coming along with it, at least a first part of the cut collected products into the selected compartment. In this case, the unloading stroke may, alternatively, form an "open" bunch in the selected compartment, complete an "open" bunch already present, unload an already "closed" bunch or complete an "open" bunch by transforming it into "closed".

The manipulator assembly for elongated products, according to the invention, is configured to be associated with a measuring path, arranged downstream of a cutting assembly according to a longitudinal feeding direction for receiving on a respective receiving plane the products cut by the cutting assembly.

The manipulator assembly is functionally, that is operationally, interposed between the measuring path and the storage for the cut products.

It comprises at least one gripping device, preferably a pair of gripping devices put side by side parallelly in said longitudinal direction, each comprising at least one gripping member, preferably a bank of gripping members.

The gripping device cooperates with the measuring path, in particular with any pre-storage compartments put side by side to it, being movable with respect to the measuring path and the storage in a collecting motion according to a collecting direction so as to collect at least part of the products cut by the cutting assembly, in a transfer motion for transferring the collected cut products to the storage and in an unloading motion according to an unloading direction for releasing the collected cut products, or a part of them, in one or more compartments in the storage.

The gripping device comprises a plurality of gripping members which may be selectively operated in groups, each group comprising a plurality or bank of adjacent gripping members, aligned according to the aforementioned longitudinal direction.

Preferably, the manipulator assembly is suspended on the top of the measuring path.

Preferably, the manipulator assembly is movable according to the aforementioned transfer motion along respective guides raised above the measuring path.

Preferably, the manipulator assembly is configured for crossing the measuring path, moving to the two sides of the same measuring path, to quickly transfer the cut products collected and unload them inside any compartment of the storage next to the measuring path. For this purpose, in particular, the manipulator assembly is configured for crossing the measuring path at the top.

The apparatus for handling elongated products according to the invention comprises a measuring path arranged downstream of a cutting assembly according to a longitudinal feeding direction, for receiving the products cut by the cutting assembly on a respective receiving plane, a storage arranged laterally to the measuring path and comprising a plurality of compartments, for housing the cut products, grouped in bunches formed also following further cutting cycles, the aforementioned bunches being defined as "closed" when they include a required quantity of cut products and "open", in formation, until the aforementioned required quantity of cut products is reached, and at least one manipulator assembly operating at the side of the measuring path, comprising at least one gripping device movable in a collecting motion according to a direction of collecting the cut products, in a transfer motion according to a transfer direction to transfer the collected cut products to the storage and in an unloading motion according to an unloading direction to unload the collected cut products in one or more compartments of the storage.

Preferably, the apparatus comprises at least one pre-storage compartment arranged on at least one side of the measuring path, preferably adjacent to it.

The at least one pre-storage compartment is preferably accessible to the cut products, positioned after cutting on the measuring path, by tilting, translation or falling.

The at least one pre-storage compartment is configured to receive the cut products at least temporarily from the receiving plane, in order to promptly release the aforementioned receiving plane. In this case, the manipulator assembly is configured to collect the cut products from the aforementioned pre-storage compartment.

In this case, in particular, the at least one pre-storage compartment can mainly perform the function of freeing the receiving plane, enabling the formation of preferably "open" bunches therein, to be transferred by means of the manipulator assembly to the storage, for the respective completion in "closed" bunches.

According to a further particular aspect of the invention, the apparatus preferably comprises a plurality of pre-storage compartments on at least one side of the measuring path and at least one deviating member associated with at least one pre-storage compartment for selectively releasing the cut products into one of the pre-storage compartments.

In this case, the presence of several pre-storage compartments can allow the formation of as many "open" bunches therein and possibly completion thereof in "closed" bunches before being transferred to the storage compartments, thanks to the manipulator assembly. In this case, the pre-storage compartments can effectively act as an accumulation buffer for the formation of even "closed" bunches, thus reducing the travel of the manipulator assembly for filling each compartment of the storage.

Preferably, the apparatus, in particular the measuring path, comprises at least one tilter or at least one translating or pushing member, for laterally transferring the cut products from the receiving plane to the at least one pre-storage compartment, for example to the adjacent pre-storage compartment.

Preferably the at least one pre-storage compartment is arranged at a lower level than the measuring path, so as to be able to receive the products cut by gravity.

Advantageously, the method for optimising the cutting and the manipulator assembly of elongated products use one or more gripping devices to move the cut products, so as to transfer them directly from the measuring path or from a pre-storage compartment, if provided, to any compartment of the storage.

Usefully, the manipulator assembly, capable of the aforementioned transfer motion, solves the problem of known solutions, connected with the unloading of the products by gravity. In particular, the known solutions which use gravity unloading may have a limited number of optimisation compartments, since the portion of the receiving plane of the measuring path, from which the products are released, is limited. On the contrary, according to the invention, the cut products are released following the transfer made by the manipulator assembly to any compartment of the storage, even considerably spaced away. This therefore allows the indefinite expansion of the width of the storage and consequently, the number of compartments available for cutting optimisation, thus optimising the number of bunches that can remain "open" while waiting for closure, therefore of "nesting" operations.

The storage may be easily built on the ground, with very low costs and without having to resort to expensive equipment.

Furthermore, it should be noted that the provision of the storage compartments served by the manipulator assembly may satisfy two correspondingly different needs: firstly, the need to quickly clear the measuring path and compose the so-called "open" bunches in a greater number of compartments, and secondly, the need to accumulate "closed" bunches, waiting for the downstream apparatuses to be available for the processing thereof.

According to the invention, the same storage means, the storage compartments, are interlocked with the manipulator assembly, to optimise the "nesting" of the production.

Preferably, the manipulator assembly may also collect the bunches once closed for distribution thereof to the downstream machines.

The compartments of the storage are preferably located substantially on the ground, aligned and parallel to the side of the measuring path.

In practice, according to a particular aspect of the invention, each compartment may be able to perform a double function, thanks to the presence of the manipulator assembly. In fact, it can indifferently assume, in relation to the progress of the work cycle, the function of containment compartment of the "open" bunches, for the emptying of the measuring path and, therefore, for the optimisation of the cutting operations ("nesting") and also the function of accumulation compartment of a "closed" bunch, at the service of further processing operations. Advantageously, the role change can take place in the same compartment, without involving any movement of the cut products.

Therefore, thanks to the method and the manipulator assembly according to the invention, it is possible to considerably increase the number of storage compartments for the optimisation of cutting operations, thus reducing waste without incurring high costs.

It is also possible to considerably increase the number of compartments intended for the accumulation of "closed" bunches, without increasing the overall dimensions, in particular longitudinal, of the cutting system, thanks to the operation of the manipulator assembly at the side of the measuring path.

It is important to note that the method and the manipulator assembly according to the invention concur to drastically reduce the noise associated with the work cycle, intervening on the unloading phases of the materials which, according to the known art, are instead entrusted to the fall by gravity.

In particular, the manipulator assembly equipped with at least one gripping device preferably grasps and holds the cut products, in the collecting and unloading motion, relative to the measuring path, coming along with the aforementioned products.

Furthermore, the manipulator assembly is movable relative to the measuring path in a transfer motion, preferably transversal, in particular perpendicular, to the measuring path, of the cut products.

The manipulator assembly, thanks to the aforesaid motions of loading, unloading and transfer, thus avoids the fall of the cut products by gravity alone.

In practice, each gripping device may collect the cut products downstream of the cutting assembly, directly from the measuring path or from the special pre-storage compartments preferably integrated with the measuring path, and then deposit them, after transfer, in the storage compartments, selected from time to time, preferably by means of a plant control system.

The storage compartments are preferably made on one side or on both sides of the measuring path, being separated by respective separator elements.

Each gripping device comprises one or more, preferably a plurality or a bank of, gripping members, preferably of the gripper or jaw type, or the like.

Advantageously, the gripping members of the same bank or gripping device may be selectively activated, in groups of single adjacent gripping members. Such groupings preferably have, longitudinally, length and position dependent on the length and position, along the longitudinal direction, of the cut products to be handled, therefore to be collected, held and unloaded.

According to a particular aspect, at least one gripping member of the manipulator assembly comprises a frame and at least one gripping prong, articulated to the frame by means of the interposition of a kinematic chain, so as to be movable between an open condition and a closing condition, to wrap and hold the cut products. The provision of an intermediate kinematic chain reduces the size of the gripping member in the open condition and, therefore, reduces the width of the separating elements of the compartments in the storage and therefore the total width of the storage with the same compartments.

According to a preferred solution, the aforesaid kinematic chain is made by means of a rod mechanism and crank and slotted link.

The overall costs of an apparatus according to the invention comprising the aforementioned manipulator assembly are significantly reduced thanks to the use of extremely compact equipment that concentrates different functional roles.

Furthermore, according to a particular aspect of the invention, both the cutting optimisation and the organization of the downstream processes may be improved thanks to the possible dual functionality of the same storage, wherein each compartment can perform a double function, that is it changes its function in relation to the completion of the bunch of cut products.

This dual nature of the storage compartments, made possible by the functionality of the manipulator assembly, can ensure effective optimisation of the cutting operations and also manage the accumulation and downstream distribution of "closed" bunches of cut products.

Furthermore, it should be noted that thanks to the fact that in order to move the cut products the manipulator assembly does not need to resort to the gravity of the materials, the invention offers advantages not only in terms of reduced noise, but also in terms of safety and accessibility. In this regard, for example, it is important to note that the storage compartments can be made at the same reduced height, preferably on the ground, and being therefore easily accessible.

According to a particular aspect of the invention, the manipulator assembly can be made mobile according to a further transfer motion in the longitudinal direction, to further optimise the management of the collecting, transfer and unloading of the cut products in the storage compartments. In particular, it is possible to provide that the cut products to be transferred are located along the measuring path or along pre-storage compartments associated with the measuring path and that the manipulator assembly, in particular the gripping device or parts thereof, can be also moved along the longitudinal direction in order to distribute the products as desired along the same longitudinal direction, in the compartments of the storage.

According to a particular aspect of the invention, the same manipulator assembly can usefully carry out the collection of the cut products, stored in "closed" bunches in respective compartments of the storage, as well as the transfer thereof to distribution paths, with rollers or the like, preferably arranged parallel to the storage compartments.

DESCRIPTION OF DRAWINGS

The details of the invention will become more evident from the detailed description of a preferred embodiment of the manipulator assembly of elongated products and of the apparatus according to the invention, illustrated by way of example in the accompanying drawings, wherein:

FIG. 1 shows a perspective view of a plant for cutting bars, comprising an apparatus for handling elongated products, equipped with the manipulator assembly according to the invention;

FIG. 1*a* shows an enlarged detail of FIG. 1, included in a circle drawn in broken line in FIG. 1;

FIGS. 17 to 22 show a front view of a portion of the plant wherein the apparatus according to the invention is visible, in further operating steps, in a third embodiment;

FIG. 25 shows a front view of a portion of the apparatus illustrated in FIG. 24;

FIGS. 26 and 27 show a front view of a detail of the manipulator assembly, according to respective embodiments.

BEST MODE

Figure 2:
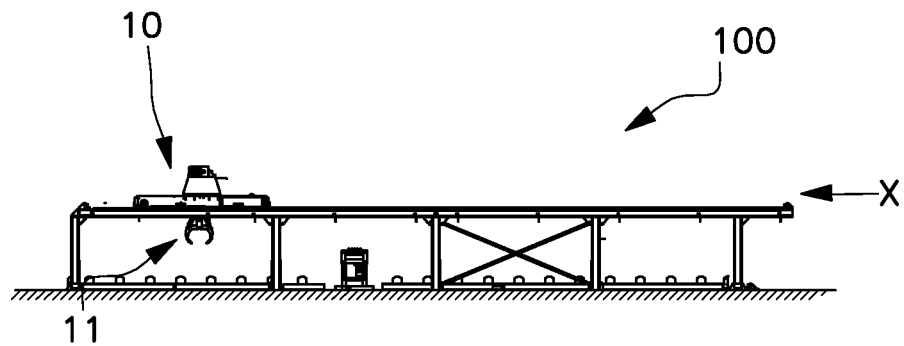
FIGS. 2 to 8 show a front view of a portion of the same plant, wherein the same apparatus is visible, during further operating steps.

With particular reference to the figures, the reference number 1 indicates a plant for cutting elongated products 2, in particular bars for making reinforcement from reinforced concrete.

The plant 1 includes, in particular, a cutting assembly 3 which cuts the products 2 to size, thus making cut products 2a available for further processing.

The plant 1 comprises an apparatus for handling 100, comprising a manipulator assembly 10 of the cut products 2a, cooperating with the aforementioned cutting assembly 3, and a measuring path 4.

The cutting assembly 3, in particular, is interposed between a feeding area 5 and the aforementioned measuring path 4, arranged in succession along a longitudinal direction Y.

In particular, the aforementioned feeding area 5 can be made, for example, by means of a roller path, on which the products 2 can be fed in the longitudinal direction Y (see FIG. 1). Alternatively, the feeding area 5 can define an area in which suitable means can feed, for example by traction, the products 2, arranging them along the longitudinal direction Y on the measuring path 4.

The measuring path 4 is configured to receive the cut products 2a on a respective receiving plane 4a. The cut products 2a can optionally be transported along the longitudinal direction Y after cutting, to leave space on the measuring path 4 for further cut products 2a. In this case the cut products 2a assume, following the mentioned longitudinal displacement, a controlled longitudinal position, to be subsequently picked up, as described below. In practice, if a product 2 is for example twelve meters long, it can produce, following further cutting operations of the same cycle, pieces, i.e. cut products 2a, respectively, for example, of three, four and five meters long, arranged in succession on the reception plane 4a.

More precisely, the products 2 to be cut, in particular bars, in any number, one or more, can be fed in advance along the longitudinal direction Y, to the feeding area 5 and subsequently carried on the measuring path 4, beyond the cutting assembly 3, to be advanced to size, at a programmed cutting length with respect to the cutting plane of the shear.

At each cutting cycle it is possible to provide that only one product 2 is cut, as well as, more usually, a plurality of products 2. Meaning both cases, hereafter, reference will be made to a plurality for simplicity.

As anticipated, each product 2, of a specific initial length, can usually be cut into several cut products 2a of shorter length, even different from each other.

This involves the production of cut products 2a, even different ones, i.e. also of different lengths, starting from the products 2 to be cut, fed in the same cutting cycle, so as to be able to compose at the same time different "open" bunches 2b of cut products 2a, in formation.

Each "open" bunch 2b, therefore in formation, contains the cut products 2a that are part of a particular order, which in the specific sector is defined as an "item" or "label". Each order is characterised, in particular, by a certain number of cut products 2a, also possibly of a different type, usually of the same length, and each "open" bunch 2b may comprise cut products 2a coming from different cutting cycles, according to the current nesting program.

Consequently, different "open" bunches 2b may comprise different quantities and types of cut products 2a and therefore be completed following a plurality of cutting cycles carried out by the cutting assembly 3.

By simplicity, the 2b bunches are meant in the following "open" as long as they are incomplete, therefore before reaching the desired quantity of cut products 2a, that is provided for by the relative order, while they are defined "closed" bunches 2c upon their respective completion, therefore upon reaching the aforementioned required quantity for the specific bunch.

It is worth noting that different quantities of products 2 can be cut in successive cutting cycles, with combinations of lengths that can be equally different.

The apparatus 100 includes a storage 6, downstream of the measuring path 4, at the side thereof or at both sides, preferably and usefully placed on the ground.

The storage 6 includes a plurality of compartments 7 for optimising and storing the cut products 2a, cut from time to time.

These compartments 7 are arranged along the longitudinal direction Y, preferably side by side, on one side or on both sides of the measuring path 4, so as to arrange in an orderly manner the cut products 2a therein, by the manipulator assembly 10, from time to time cut to size by the cutting assembly 3, also following different cutting cycles.

In practice, it normally happens that an optimisation program used in plant 1, in search of a better combination of the cutting cycles, therefore of a production optimisation, divides the completion of the "open" bunches 2b into different cutting cycles, even not consecutive, of products cut to size 2a.

Each double-function compartment 7 of the storage 6 can then advantageously receive, by means of the manipulator assembly 10, cut products 2a, obtained in different, even non consecutive, cutting cycles, waiting for completing, therefore for "closing", a respective "open" bunch 2b.

Therefore the compartments 7 may perform a first function, collecting cut products 2a in single "open" bunches 2b, and a second function, storing "closed" bunches 2c until they are required by the following processing lines.

The compartments 7 may be advantageously made on the ground, therefore may be easily arranged in a large number, at a very low cost, thus allowing the combination at the same time of an equally high number of orders, in formation in the "open" bunches 2b. This circumstance allows an effective optimisation, with a consequent reduction in waste.

In particular, the compartments 7 are particularly economical, as they do not necessarily include dedicated operation means or mechanisms for handling the cut products 2a, which, on the other hand, can remain inside the single compartment even when the respective "open" bunch 2b has become "closed" 2c.

Each compartment 7 is preferably defined by separator members 7a, capable of defining a containment space between thereof, for example in the shape of a cradle, for the cut products 2a (see FIG. 1a).

The manipulator assembly 10 can fill and possibly empty the compartments 7 of the storage 6.

The manipulator assembly 10 comprises at least one gripping device 11, configured to be movable at least in a collecting motion, in a transfer motion and in an unloading motion, to collect, transfer and discharge of the cut products 2a in each cutting cycle, in particular from the receiving plane 4a of the measuring path 4, to the respective compartments 7 of the storage 6, for setting several "open" 2b or "closed" bunches of products 2a cut to size.

The apparatus 100 comprises a single gripping device 11 in the embodiment shown in FIGS. 1-8. Alternatively, it is possible to provide that the apparatus 100 comprises several gripping devices 11, for example a pair of gripping devices 11, as illustrated in detail below.

Each gripping device 11 comprises at least one gripping member 11a, preferably a bank, that is a plurality of gripping members 11a, movably carried by a support structure 12 of the manipulator assembly 10 (see FIGS. 1 and 2).

Each gripping member 11a is preferably made like pincers or jaws or through equivalent means, for collecting, holding and unloading the cut products 2a.

The gripping member 11a may comprise a frame 110, a first gripping prong 111 and a second gripping prong 112, articulated to the same frame 110 (see FIG. 26). The first prong 111 and the second prong 112 may be operated by means of an actuator member 113, for example a hydraulic actuator, between an opening condition, traced in FIG. 26, wherein the first prong 111 and the second prong 112 are mutually separated, and a closing condition, at which they are placed side by side, so as to define a closed enclosure for gripping the cut products 2a.

According to an alternative solution, illustrated by way of example in FIG. 27, it is possible to provide that the first prong 111 and the second prong 112 are articulated to the frame 110 by means of the interposition of a kinematic chain 114, in particular a binary chain. For example, this kinematic chain 114 can be made by means of a crank and slotted link.

The particular articulation of the first prong 111 and of the second prong 112 or of only one of them allows the reduction the overall dimensions of the gripping member 11a' in the open condition, thus reducing the width of the separating elements 7a of the compartments 7, to the benefit of the space usefully used for the cut products 2a.

Preferably, the gripping members 11a, 11a' of the same bank of the same gripping device 11 are aligned along the longitudinal direction Y and can be operated, even selectively, alternatively between the open condition and the closed condition, and between a raised condition and lowered condition, according to a collecting direction Z and an unloading direction Z, preferably coinciding and substantially vertical.

In particular, the gripping members 11a, 11a' of the gripping devices 11 are preferably movable alternatively in said collecting motion and in said unloading motion along the collecting direction Z and respectively the unloading direction Z, which are substantially vertical, for collecting the cut products 2a, in particular, from the receiving plane 4a and for unloading thereof, preferably guiding them, inside a respective compartment 7, following said transfer motion in a transfer direction X, preferably transversal. In this way, advantageously, the noise generated by putting down the cut products 2a is very reduced.

Advantageously, the gripping members 11a, 11a' of the same bank or gripping device 11 may be selectively activated, in groups of single adjacent gripping members 11a, 11a'. These groupings preferably have extension and position, along the longitudinal direction Y, which vary according to the length and position of the cut products 2a to be collected, held and unloaded.

Preferably, said groupings of gripping members 2a may be modified according to the cutting cycle, so as to adapt the collecting, holding and unloading capacity to the current cutting cycle.

In practice, if, for example, a cutting cycle determines the production in succession along the measuring path 4, of cut products 2a of three different lengths, the bank of gripping members 11a, 11a' can be usefully grouped, operationally, into three groups of gripping members 11a, 11a', each of which extending its operating capacity for collecting, holding and unloading, along the longitudinal development of the measuring path 4, so as to interact effectively on three lengths of cut products 2a. It follows that, by selectively grouping the gripping members 11a, 11a' of the same bank or gripping device 11, it is possible to selectively release the collected cut products 2a withdrawn, in more than one compartment 7 of the storage 6.

It is also possible, for the same reason, to selectively collect the cut products 2a.

Furthermore, the gripping members 11a, 11a' may grip cut products 2a of the same cutting cycle or of cut products 2a made in different cutting cycles, possibly after being suitably displaced along the measuring path 4 with a displacement motion along the longitudinal direction Y preferably on the receiving plane 4a.

More precisely, the products cut 2a in a cutting cycle, usually of different lengths, can preferably be collected simultaneously from the measuring path 4. After being displaced thanks to the transfer motion of the manipulator assembly 10 along the transfer direction X, the same cut products 2a can be deposited in different unloading cycles, so that cut products 2a of different length, for example, can be stored in different compartments 7. This is possible by activating simultaneously a selection, that is an appropriate grouping, of gripping members 11a, 11a ', which involves only the longitudinal extension of the cut products 2a to be unloaded in the respective unloading cycle.

In the same way, the gripping device 11 may be movable with a further collecting motion and a further unloading motion, for collecting "closed" bunches of the cut products 2a from the compartments 7 and unloading them to the subsequent work stations, after a further transfer motion, preferably in the direction of transfer X.

Also in this case, it is possible to usefully provide that the gripping members 11a, 11a' of the bank or gripping device 11 are operated selectively, i.e. involving only the gripping members 11a, 11a' in each collecting and/or unloading cycle affected by the longitudinal extension and the position of the cut products 2a to be handled.

More precisely, the manipulator assembly 10 is movable in said transfer motion along the transverse direction X, to allow the transport of the cut products 2a in particular from the receiving plane 4a to any compartment 7, even considerably spaced, of the storage 6.

The manipulator assembly 10 is preferably suspended on the top of the measurement path 4. In this way it can cross it, bypassing it, from one side to the other, thus reducing the longitudinal dimensions of the system.

In particular, the support structure 12 can be supported slidingly by a run path 13, in particular raised with respect to the measuring path 4, preferably by a pair of run paths 13, spaced along the longitudinal direction Y.

Each run path 13 is preferably supported in turn by respective uprights 14.

The support structure 12 can advantageously be operated sliding along respective guides formed by the run paths 13, to perform the aforementioned transfer motion along the transverse direction X. Alternatively, the manipulator assembly 10 and the support structure 12 can be supported by a stand structure of a known type.

In the case shown for illustrative purposes, in FIGS. 1-8, the manipulator assembly 10 comprises a single gripping device 11 comprising in turn a plurality of gripping members 11a, 11a' aligned along the longitudinal direction Y.

It is possible to provide for the supply of several gripping devices 11, for example placed side by side, preferably operable independently, as described below, to reduce the number of movements of the manipulator assembly 10, which can therefore handle a greater number of cut products 2a.

Furthermore, it is possible to provide that the bank or banks or gripping devices 11 of the manipulator assembly 10 are also movable in the aforementioned longitudinal direction Y in order to be able to displace the cut products 2a at will, also along this direction. In this way, each constraint can be eliminated in the positioning of the products cut 2a in the compartments 7.

The operation of the apparatus for handling elongated products, which implements the method for optimizing the cut according to the same invention, is understandable from the above description.

At an early stage, the products cut 2a are made available downstream of the cutting assembly 3 on the measuring path 4 (see FIG. 2).

Figure 3:
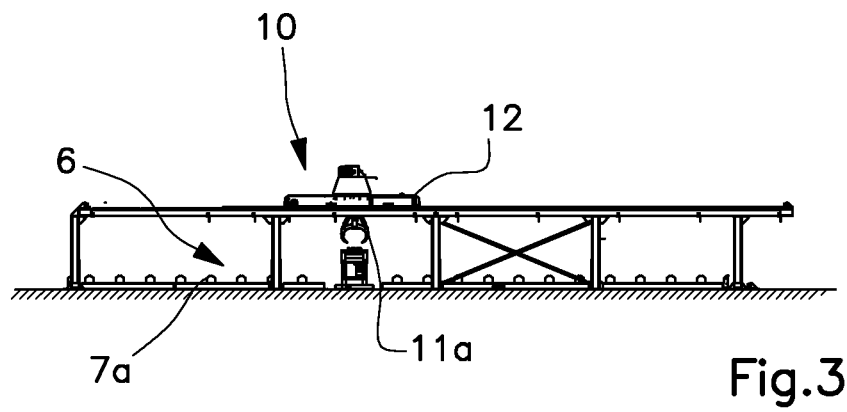

The gripping device 11 of the manipulator assembly 10 is then positioned at the measuring path 4 for collecting the aforementioned number of products cut 2a (see FIG. 3).

Figure 4:
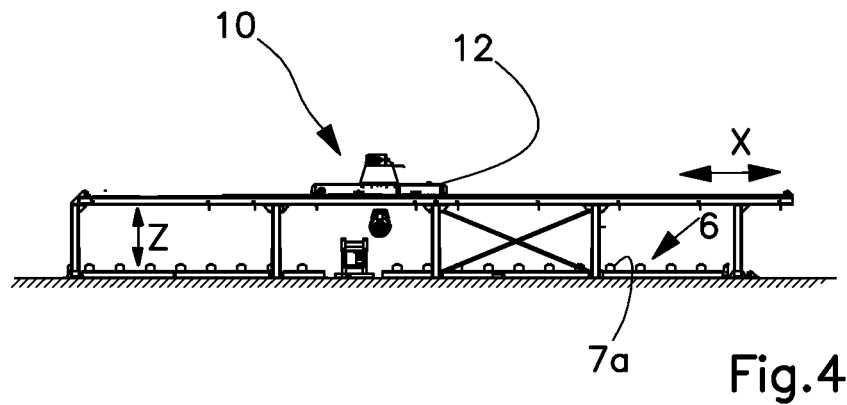
Figure 5:
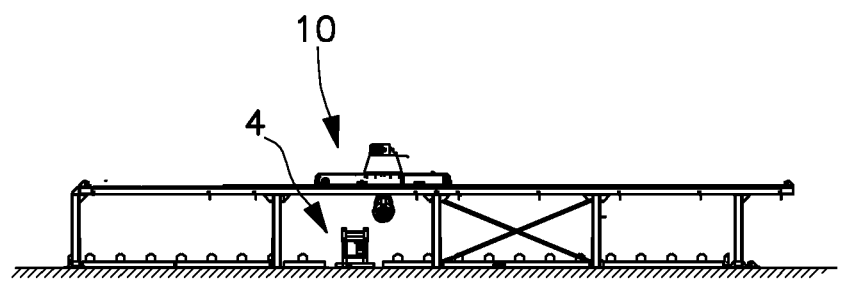

Subsequently the gripping device 11 is operated in the collecting motion according to the collecting direction Z so as to take the number of cut products 2A (see FIG. 4). If necessary, lifting means cooperating with the measuring path 4 may facilitate this operation, in order to move the products cut 2a close to the gripping device 11.

Figure 6:
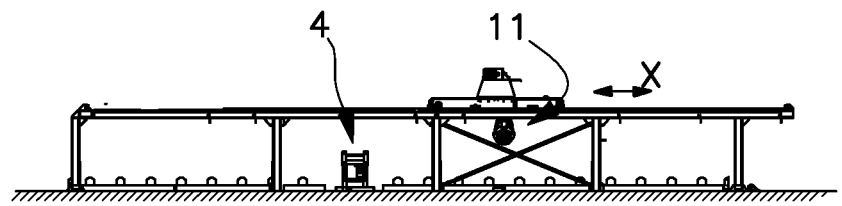

The gripping device 11 of the manipulator assembly 10 is then moved in the transfer direction X according to the transfer motion, to position itself at a selected compartment 7 (see FIG. 6).

Figure 7:
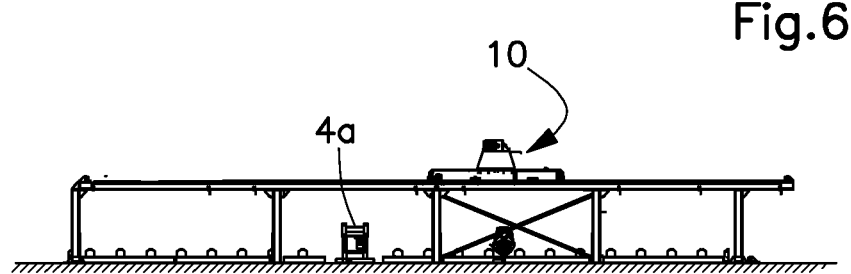
Figure 8:
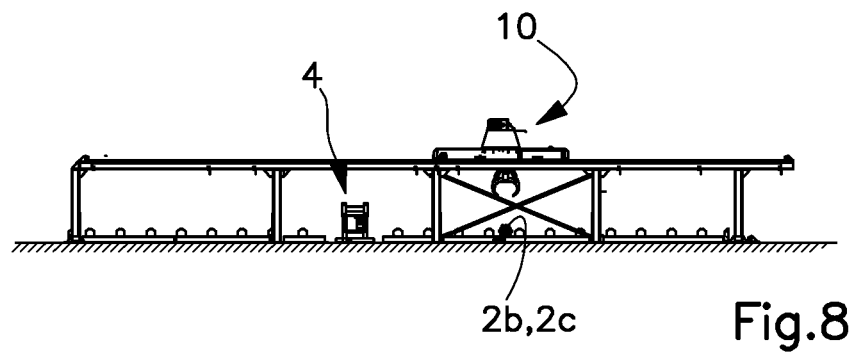
Figure 9:
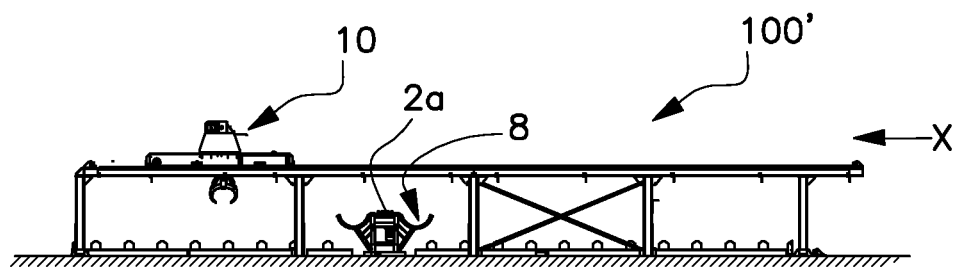
FIGS. 9 to 16 show a front view of a portion of the plant wherein the aforementioned apparatus is visible, during further operating steps, in a second embodiment.
Figure 10:
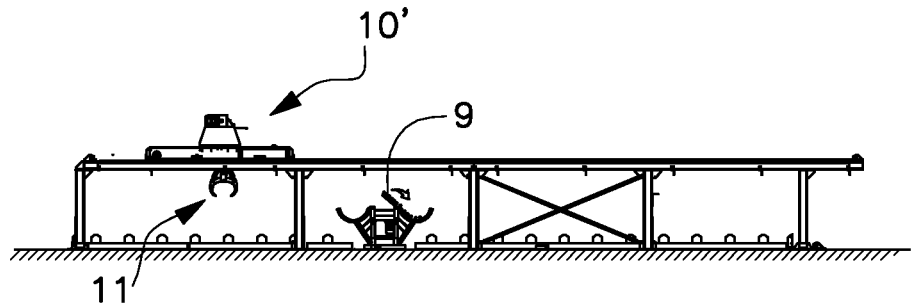
Figure 11:
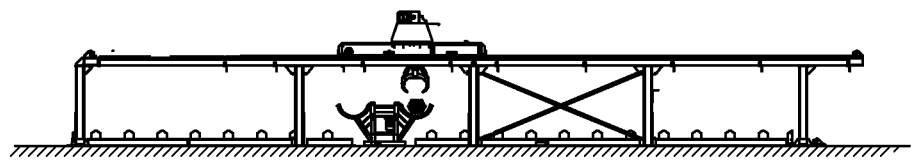
Figure 12:
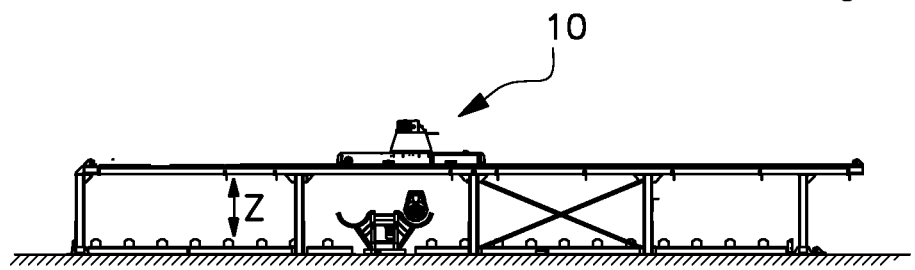
Figure 13:
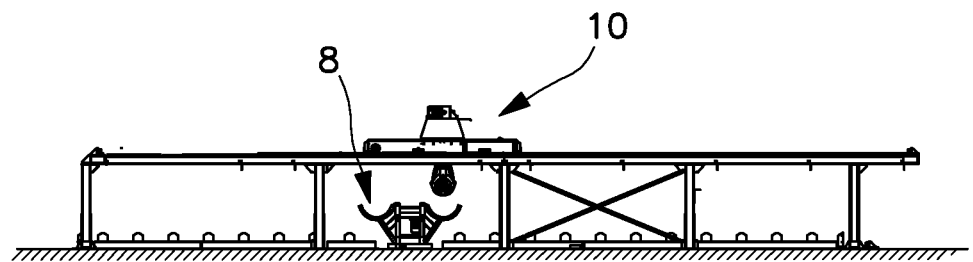
Figure 14:
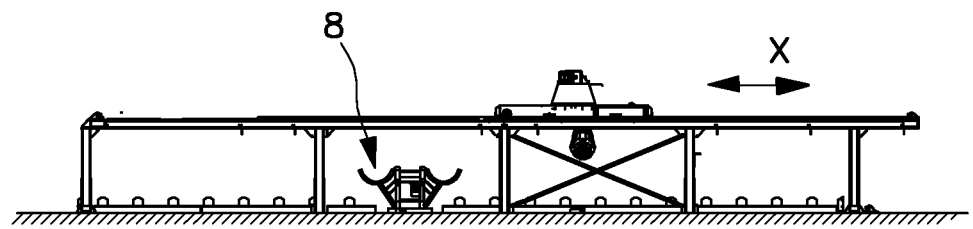
Figure 15:
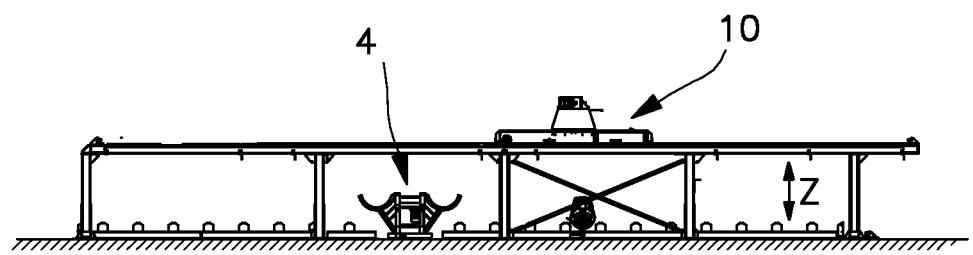
Figure 16:
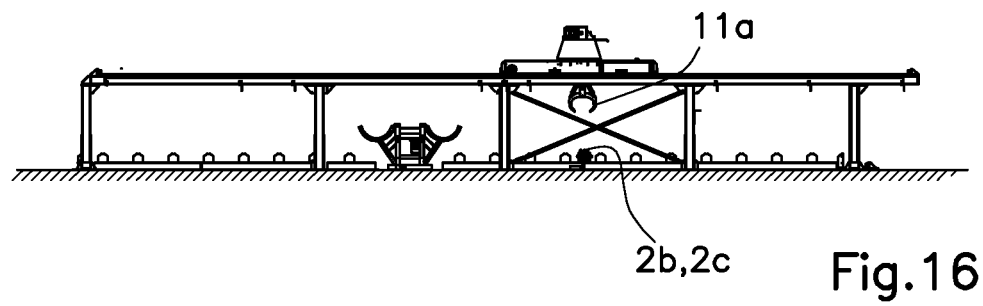
Figure 23:
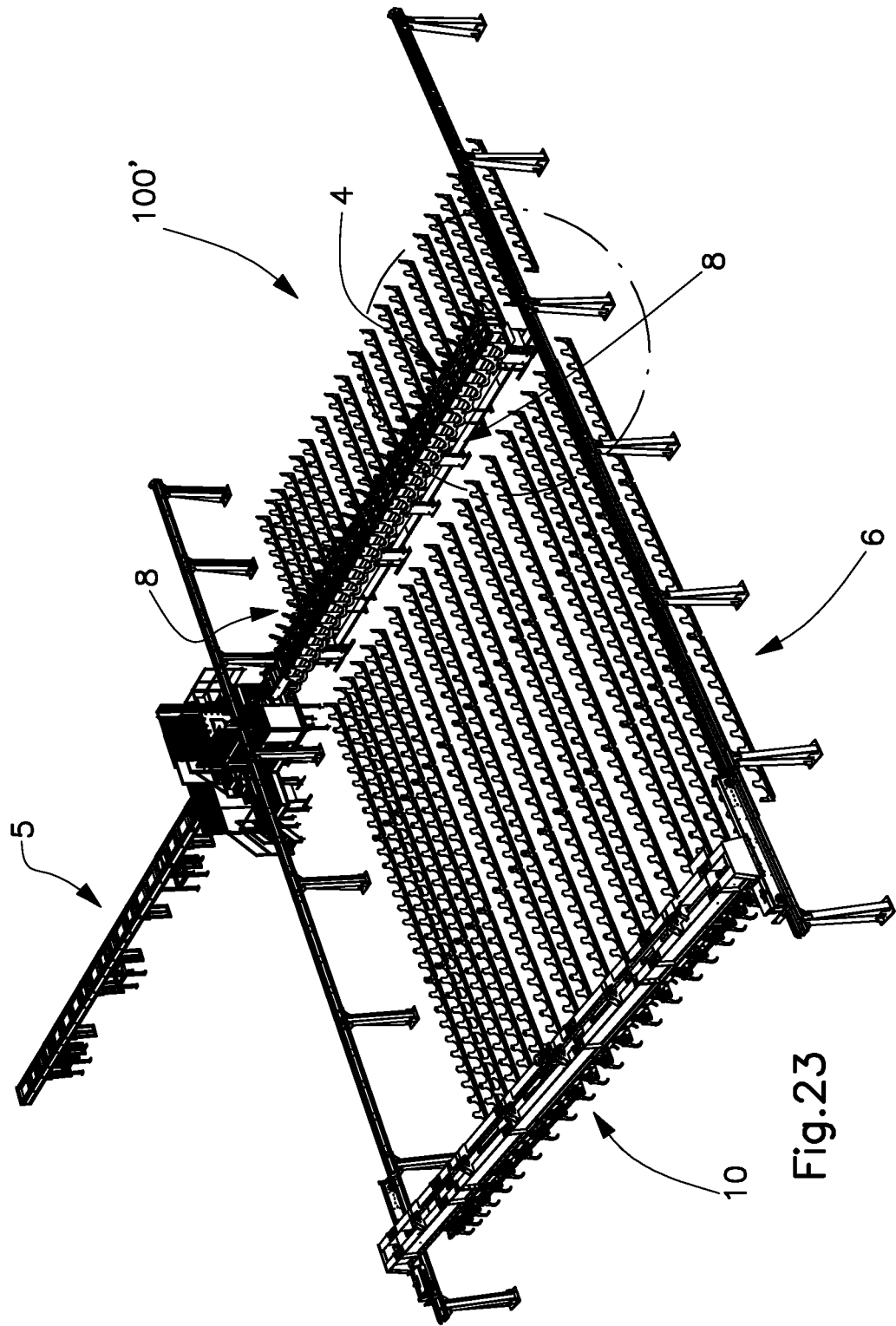
FIG. 23 shows a perspective view of a plant for cutting bars, comprising the apparatus according to the invention in the embodiment illustrated in FIGS. 9 to 16.
Figure 23A:
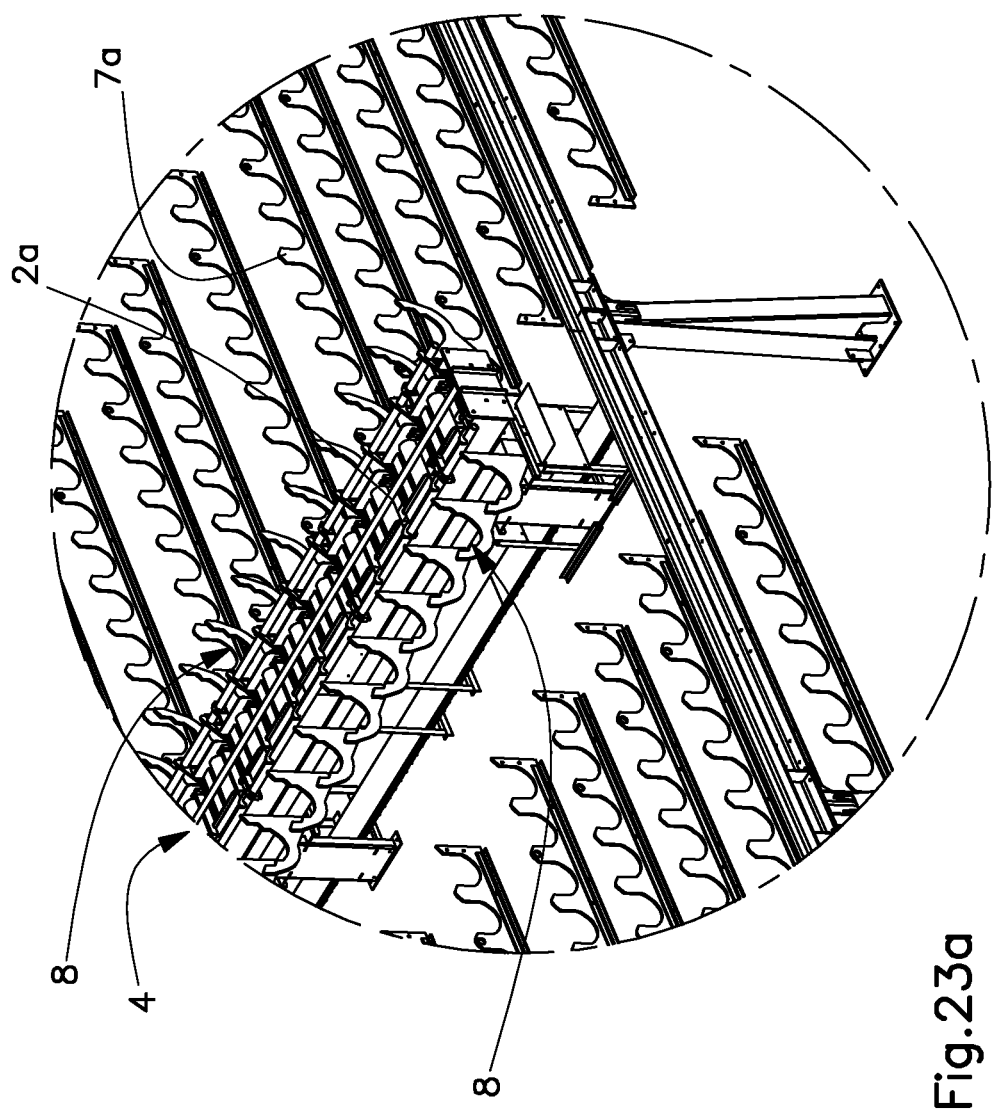
FIG. 23*a* shows an enlarged detail of FIG. 23, included in a circle drawn in broken line in FIG. 23.

The gripping device 11 is then operated in the uploading motion, for uploading the cut products 2a, or part of them, selectively operating the gripping members 11a, 11a' in the aforementioned compartment 7, preferably coming along with this delivery so as to minimise the produced noise (see FIG. 7).

In this way an "open" bunch 2b can be formed, integrated, completed in the respective compartment 7 (see FIG. 8) or directly a "closed" bunch can be transferred therein.

Subsequently, the manipulator assembly 10 can be usefully operated again in the aforementioned transfer motion, to position the gripping device 11 at an additional compartment 7 and continue or complete the unloading step of the collected cut products 2A.

The manipulator assembly 10 can then preferably repeat additional collecting, transferring and unloading cycles of cut products 2a, intended for transporting "closed" bunches or, advantageously, for forming, integrating or completing respective "open" bunches in the compartments 7, as described above.

According to a further embodiment of the apparatus 100' for handling, shown for illustrative purposes in FIGS. 9-16, 23 and 23a, it is possible to provide for the measuring path 4 to be placed beside one or more temporarily pre-storage compartments 8, capable of temporarily receiving the cut products 2a, made available along the measuring path 4. In order to enhance comprehension, the same reference numbers were used in the figures, to indicate features functionally and/or structurally the same or similar to those described above.

The pre-storage compartments 8 may, for example, be made up of an adjacent containment structure placed, for example in a fixed way, beside to the measuring path 4.

Pre-storage compartments 8 can be advantageously made at a lower level with respect to the measuring path 4, for example one per side, to quickly receive the products 2a, for example by gravity, as soon as they are cut and made available on the receiving plane 4a (see FIG. 10), thus quickly freeing the measuring path 4a and leaving space to further operations of the cutting assembly 3.

For example, the measuring path 4 may be equipped with tilting members 9, to cause the displacement of the products cut 2a from the receiving plane 4a to the relative adjacent pre-storage compartment 8.

The tilting members 9 can be made up for example of respective levers, preferably a plurality for each pre-storage compartment 8, alternately movable between an inactive configuration, submerged with respect to the receiving plane 4a, and an active, emerged and inclined configuration at the top od said plane, at which the cut products 2a are lifted from the receiving plane 4a and tilted towards a respective pre-storage compartment 8. In this condition, the tilting members 9 can preferably serve as a slide for the cut products 2a.

The pre-storage compartments 8 have the advantage of releasing the measuring path 4, actually acting as a storage unit while the manipulator assembly 10 handles the cut products 2a. The presence of pre-storage compartments 8 therefore makes the apparatus 100' even more efficient. In particular, the manipulator assembly 10 may quickly transfer preferably "open" bunches 2b from the pre-storage compartment 8 to the storage 6, then completing the same bunches in a smaller number of trips.

The operation of the apparatus 100' is otherwise quite similar to what was previously illustrated for the first embodiment.

It is only specified that in the presence of at least one pre-storage compartment 8, the cut products 2a made available on the receiving plane 4a following a cutting cycle, are moved, for example by actuating the tilting members 9, in the pre-storage compartment 8.

Afterwards, the manipulator assembly 10 collects the cut products 2a stored in the meantime from the pre-storage compartment 8, by means of the gripping device 11 activated in collecting motion.

Subsequently, the collecting device 11 is operated in the transfer motion and, later, in the unloading motion, possibly by selectively operating the gripping members 11a, 11a', to store the cut products 2a in one or more compartments 7, as described above.

According to a third embodiment of the apparatus 100", shown for illustrative purposes in FIGS. 17-22, the manipulator assembly 10" may comprise more gripping devices 11 placed side by side. In particular, the presence of a pair of gripping devices 11 is advantageous.

Also in this case, in order to enhance the comprehension, the same reference numerals have been used in the figures to indicate features that are functionally and/or structurally the same or similar to those described above.

The presence of a plurality, preferably of a pair of gripping devices 11 is particularly advantageous in combination with a pre-storage compartment 8 per each side of the measuring path 4, as in the case shown in FIGS. 17 to 22, since it enables the collection in the same gripping operation of a greater number of cut products 2a from the temporary pre-storage compartments 8 and therefore the reduction of the number of trips from the measuring route 4 to the compartments 7 of the storage 6. In this case, the manipulator assembly 10" can multiply the unloading operations correspondingly.

Alternatively, it is possible to provide that the apparatus 100" has a different number of gripping devices 11 or that it does not include pre-storage compartments 8 or that it only includes one.

The operation of the apparatus 100" is very similar to what was described above.

Figure 24:
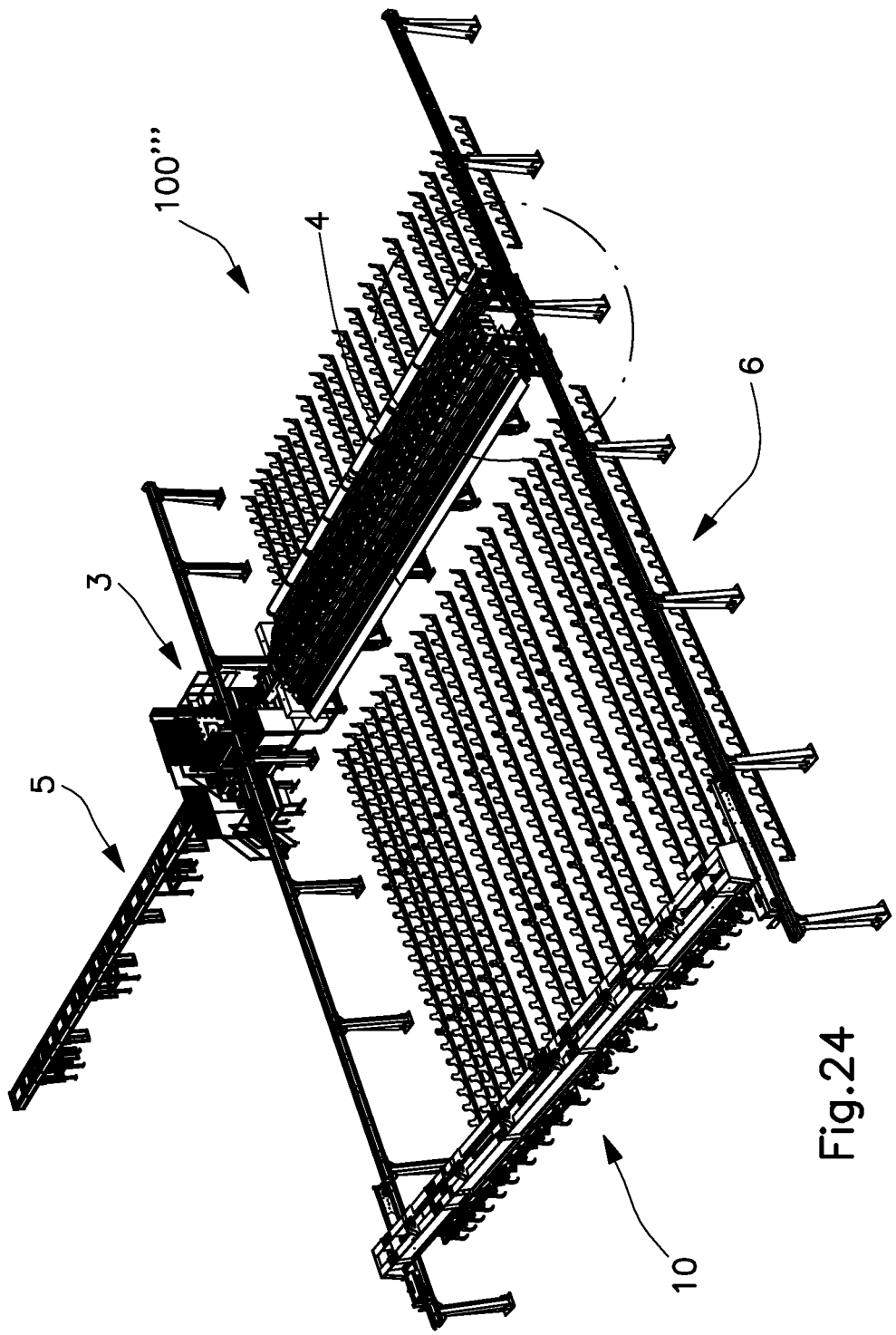
FIG. 24 shows a perspective view of a plant for cutting bars, comprising the apparatus according to the invention in a different embodiment.
Figure 24A:
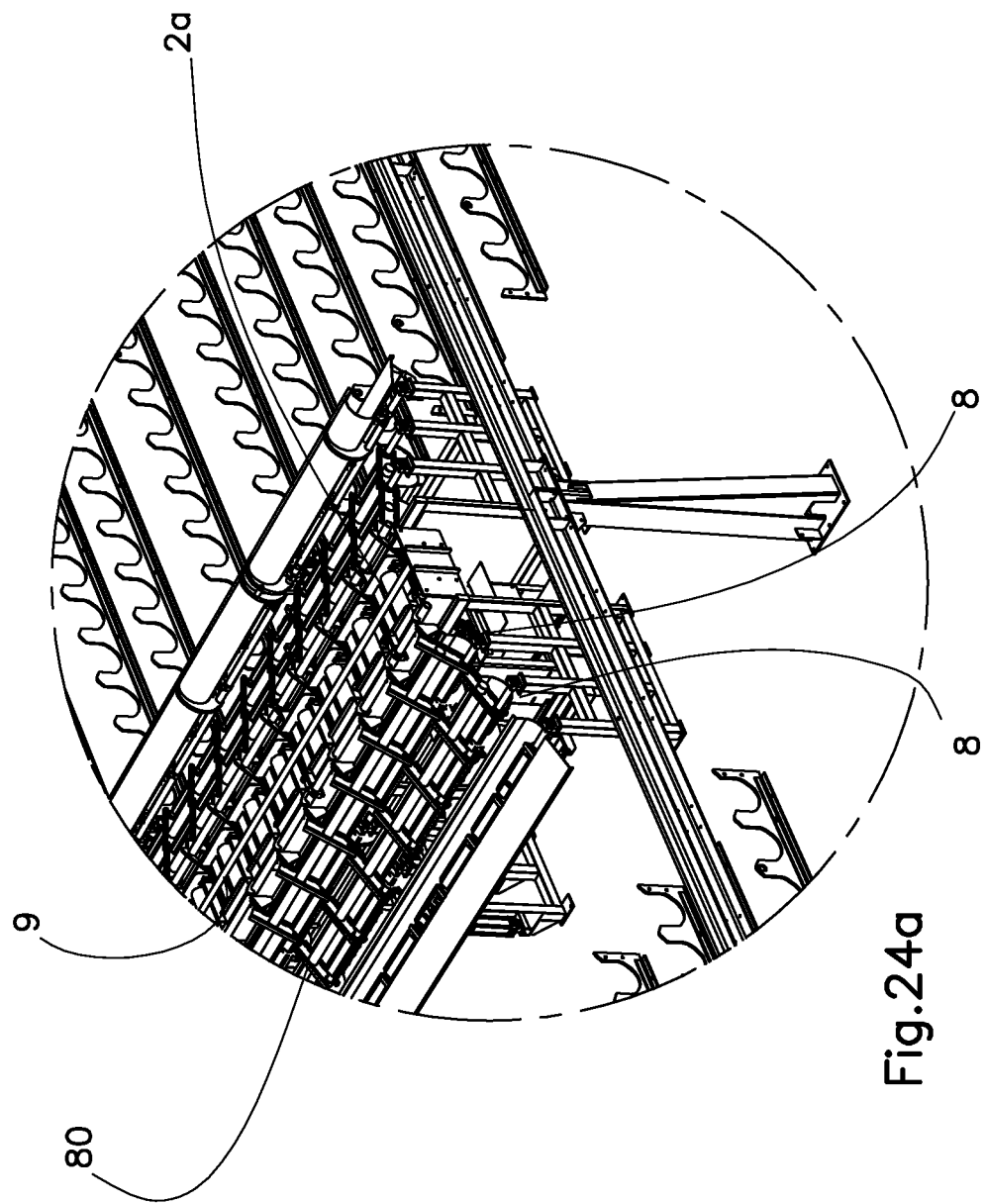
FIG. 24*a* shows an enlarged detail of FIG. 24, included in a circle, drawn in broken line in FIG. 24.

According to a further embodiment shown for illustrative purposes in FIGS. 24, 24a and 25, the apparatus 100" comprises a plurality of pre-storage compartments 8, preferably between two and four, adjacent to the measuring path 4, preferably on each side thereof.

The pre-storage compartments 8, in this case, are preferably associated in a known way to diverter members 80, alternately movable between an active configuration and an inactive configuration, to allow selective access to each pre-storage compartment 8.

Thanks to the plurality of pre-storage compartments 8 selectively accessible at the side of the measuring path 4, the cut products 2a following several cutting cycles can be temporarily stored, promptly releasing the same path for cutting operations. In this case, then, the manipulator assembly 10 can maximise the trips to the storage 6, managing the transfer of more frequently "closed" bunches from the pre-storage compartments 8.

Preferably, the pre-storage compartments 8 are made, in a known way, at a decreasing height, to allow a rapid transfer by gravity from the measuring path 4 alongside (see FIG. 24).

The operation of this embodiment is entirely similar to that described above and may be understood from the above description.

In the practical embodiment of the invention, the used materials, as well as the shape and the dimensions, may be modified depending on needs.

Should the technical features mentioned in any claim be followed by reference signs, such reference signs were included strictly with the aim of enhancing the understanding of the claims and hence they shall not be deemed restrictive in any manner whatsoever on the scope of each element identified for exemplifying purposes by such reference signs.

The invention claimed is:

1. A method for optimising the cutting of elongated products, including metal bars or profiles for reinforced concrete, comprising the steps of:
   a). arranging in succession along a feeding longitudinal direction a feeding zone, a cutting assembly and a measuring path for said products, said measuring path being configured to receive cut products by said cutting assembly on a respective receiving plane;
   b). arranging laterally to said measuring path a storage divided into a plurality of compartments, for housing said cut products, grouped in bunches formed also after further cutting cycles, said bunches being defined as "closed" when said bunches include a required quantity of said cut products and "open", in formation, until the required quantity of said cut products is reached;
   c). arranging a manipulator assembly comprising at least one gripping device configured to grip said cut products and operating at least beside said measuring path, said gripping device being movable in a collecting motion according to a collecting direction, in an unloading motion according to an unloading direction and in a transfer motion relative to said measuring path;
   d). in a suitable phase relationship feeding said products in any number along said measuring path and operating said cutting assembly in a cutting cycle, so as to make one or more consecutive cuts on said fed products and obtain along said receiving plane one or more series of cut products in succession, of the same size or of different sizes;
   e). operating said gripping device in said collecting motion according to said collecting direction to at least partially collect said cut products in said cutting cycle, said collecting device holding said collected cut products gripped;
   f). actuating said gripping device in said transfer motion, gripping said cut products collected by said gripping device;
   g). positioning said gripping device at a selected compartment of said storage;
   h). operating said gripping device according to said unloading motion in said unloading direction so as to release at least a part of said collected cut products into said selected compartment.

2. A method as in claim 1, wherein in said step e). of actuating said gripping device said cut products are collected from said receiving plane.

3. A method as in claim 1, further comprising the steps of:
   a'). providing at least one pre-storage compartment arranged at the side of said measuring path, each pre-storage compartment being configured to receive said cut products from said receiving plane in said cutting cycle;
   d'). at least temporarily releasing said cut products in said at least one pre-storage compartment, forming a said "open" bunch or a said "closed" bunch, or by integrating one said "open" bunch already present in said pre-storage compartment or, in case, transforming one said "open" bunch already present in said pre-storage compartment into a said "closed" bunch, said step e). of actuating said gripping device in said collecting motion providing for collecting said cut products from said pre-storage compartment and/or from said receiving plane.

4. A method as in claim 3, further comprising arranging a plurality of said pre-storage compartments beside said measuring path, said step d') at least temporarily releasing said cut products taking place by activating at least one diverter member associated with at least one said pre-storage compartment to selectively release said cut products into one of said pre-storage compartments.

5. A method as in claim 3, wherein said step d') at least temporarily releasing said cut products in said at least one pre-storage compartment takes place by transferring said cut products from said receiving plane by tilting through the activation of at least one tilter, by translation and/or by falling through the action of gravity.

6. A method as in claim 3, further comprising the step of operating said manipulator assembly in said transfer motion in a return stroke from said selected compartment to said pre-storage compartment or to said receiving plane, for carrying out a further cycle of collecting and unloading said cut products.

7. A method as in claim 1, further comprising repeating steps f) to h) to release a remaining part of said cut products still gripped by said gripping device into at least one further compartment after an unloading stroke, said gripping device comprising a plurality of gripping members aligned along said longitudinal direction actuatable selectively, in said steps from f) to h) said gripping members being selectively operated to unload said cut products respectively into said selected compartment and into at least said further compartment.

8. A method as in as in claim 1, further comprising providing at least one further said gripping device placed side by side parallelly to said gripping device, to combine respective gripping, transferring and/or unloading cycles, wherein said elongated products are delivered to said cutting assembly and said elongated products are cut via said cutting assembly to form said cut products, said one further said gripping device and said gripping device being configured to grip said cut products after said elongated products are cut via said cutting assembly.

9. A method as in as in claim 1, wherein said transfer motion occurs in a direction transverse to said measuring path.

10. A method as in as in claim 1, wherein said unloading motion occurs in a substantially vertical direction, coming along with the release of said cut products into said compartment of said storage.

11. A method comprising:
providing a manipulator assembly for elongated products including bars for reinforced concrete or metal profiles, associated with a measuring path, arranged downstream of a cutting assembly according to a longitudinal feeding direction, for receiving on a respective receiving plane said cut products by said cutting assembly;
providing said manipulator assembly to be operative at least laterally to said measuring path between said measuring path and a storage for said cut products arranged at one side of said measuring path and divided into a plurality of compartments;
providing the manipulator assembly such that it comprises at least one gripping device movable with respect to said way measuring path and to said storage in a collecting motion according to a collecting direction, to collect at least a part of said cut products, in a transfer motion to transfer to a selected compartment of said storage said collected cut products and in an unloading motion according to an unloading direction to release said collected cut products or part of them in said selected compartment of said storage.

12. A manipulator assembly for elongated products, including metal bars or profiles for reinforced concrete, associable with a measuring path, arranged downstream of a cutting assembly in a longitudinal feeding direction, for receiving on a respective receiving plane said cut products by said cutting assembly, and associable with a storage arranged at the side of said measuring path, said manipulator assembly comprising:
at least one gripping device movable with respect to said measuring path and to a storage in a collecting motion according to a collecting direction to collect at least a part of said cut products, in a transfer motion for transferring said collected cut products to said storage and in an unloading motion according to an unloading direction to release said collected cut products or part of said collected cut products in said storage, said gripping device comprising a plurality of gripping members selectively operable in groups, each said group comprising a plurality or bank of adjacent gripping members, aligned according to said longitudinal direction, said manipulator assembly being combined with a plant control system configured to control said gripping device in said collection, transfer and unloading motion.

13. A manipulator assembly as in claim 12, wherein said gripping members are configured to be selectively actuatable in a variable number, for handling said cut products with variable length and/or position along said longitudinal direction.

14. A manipulator assembly as in claim 12, wherein each said gripping member is configured to be independently movable in said collecting motion and/or in said unloading motion.

15. A manipulator assembly as in claim 12, wherein further comprising at least another said gripping device to provide a plurality of said gripping devices placed side by side transversely.

16. A manipulator assembly according to claim 12, wherein said transfer motion occurs in a transverse direction.

17. A manipulator assembly according to claim 12, wherein said collecting and/or unloading direction is substantially vertical.

18. A manipulator assembly as in claim 12, wherein at least one said gripping member comprises a pincer or jaw element.

19. A manipulator assembly as in claim 18, wherein at least one said gripping member comprises a frame and at least one gripping prong, articulated to said frame by means of an interposition of a kinematic chain, so as to be movable between an open condition and a closed condition, to wrap and hold said cut products.

20. A manipulator assembly as in claim 19, wherein said kinematic chain is made by means of a rod mechanism and crank and slotted link, so as to reduce the size of the gripping member in said opened condition.

21. A manipulator assembly as claim 12, wherein at least one said gripping member of said gripping device is equipped with a further transfer motion in said longitudinal direction.

22. An apparatus for handling elongated products, including bars for reinforced concrete or metal profiles, the apparatus comprising:
a measuring path is configured to be arranged downstream of a cutting assembly in a longitudinal feeding direction, for receiving on a respective receiving plane said cut products by said cutting assembly,
a storage arranged laterally to said measuring path and comprising a plurality of compartments, to house said cut products, grouped in bunches formed also after further cutting cycles, said bunches being defined "closed" when they include a required quantity of said cut products and "open", in formation, until the required quantity of said cut products is reached, and
a manipulator assembly, operative at least on the side of said measuring path, comprising at least one gripping device movable for a collecting motion according to a collecting direction to collect said cut products, in a transfer motion according to a transfer direction to transfer said collected cut products to said storage and an unloading motion according to an unloading direction to unload said collected cut products in one or more said compartments of said storage.

23. An apparatus as in claim 22, further comprising at least one pre-storage compartment arranged on at least one side of said measuring path and configured to receive said cut products, at least temporarily, from said receiving plane, said manipulator assembly being configured to collect said cut products from said pre-storage compartment.

24. An apparatus according to claim 23, further comprising:
- at least another said pre-storage compartment to provide a plurality of said pre-storage compartments on at least one side of said measuring path; and
- at least one deviating member associated with at least one said pre-storage compartment to selectively release said cut products in one of said pre-storage compartments.

25. An apparatus as in claim 23, wherein said measuring path comprises at least one tilter, conveyor or pusher, for laterally transferring said cut products from said receiving plane to said at least one pre-storage compartment.

26. An apparatus as in claim 23, wherein said at least one pre-storage compartment is arranged at a lower height than said measuring path, so as to be able to receive said cut products by gravity.

27. An apparatus as in claim 22, wherein said compartments are arranged substantially parallel, laterally to said measuring path.

28. An apparatus as in claim 22, wherein said storage is made substantially on the ground.

29. An apparatus according to claim 22, in combination with a cutting assembly to cut said products to size, a feeding area for said products to be cut, arranged upstream of said cutting assembly, with respect to a longitudinal direction, wherein the apparatus is arranged downstream, along said longitudinal direction, with respect to said cutting assembly.

30. A method according to claim 11, wherein said gripping device comprises a plurality of gripping members aligned along said feeding longitudinal direction, said gripping members being selectively operable in groups of said single adjacent gripping members.

31. A manipulator assembly as in claim 12, further comprising a support structure, wherein said gripping device is movably carried by said support structure.

32. An apparatus for handling elongated products as in claim 22, wherein:
- said gripping device comprises a plurality of gripping members selectively operable in groups, each said group comprising a plurality or bank of adjacent gripping members, aligned according to said longitudinal direction; and
- said manipulator assembly is combined with a plant control system configured to control said gripping device in said collection, transfer and unloading motion.

* * * * *